(12) United States Patent
Vedula et al.

(10) Patent No.: US 9,963,806 B2
(45) Date of Patent: May 8, 2018

(54) DYEABLE AND FLAME-RETARDED THERMOPLASTIC POLYURETHANE FIBERS

(71) Applicant: Lubrizol Advanced Materials, Inc., Cleveland, OH (US)

(72) Inventors: Ravi R. Vedula, North Ridgeville, OH (US); Mouh-Wahng Lee, Solon, OH (US); Julius Farkas, North Ridgeville, OH (US)

(73) Assignee: LUBRIZOL ADVANCED MATERIALS, INC., Cleveland, OH (US)

( * ) Notice: Subject to any disclaimer, the term of this patent is extended or adjusted under 35 U.S.C. 154(b) by 302 days.

(21) Appl. No.: 14/437,048

(22) PCT Filed: Oct. 9, 2013

(86) PCT No.: PCT/US2013/063966
§ 371 (c)(1),
(2) Date: Apr. 20, 2015

(87) PCT Pub. No.: WO2014/066037
PCT Pub. Date: May 1, 2014

(65) Prior Publication Data
US 2015/0275402 A1    Oct. 1, 2015

Related U.S. Application Data

(60) Provisional application No. 61/717,144, filed on Oct. 23, 2012.

(51) Int. Cl.
| | |
|---|---|
| *D01F 6/70* | (2006.01) |
| *C08G 18/38* | (2006.01) |
| *D01F 1/07* | (2006.01) |
| *D01F 1/10* | (2006.01) |
| *D01F 6/94* | (2006.01) |
| *D03D 15/00* | (2006.01) |
| *C08G 18/66* | (2006.01) |
| *C08G 18/76* | (2006.01) |
| *C08G 18/32* | (2006.01) |
| *C08G 18/42* | (2006.01) |
| *D03D 15/08* | (2006.01) |

(52) U.S. Cl.
CPC ........... *D01F 6/70* (2013.01); *C08G 18/3206* (2013.01); *C08G 18/3889* (2013.01); *C08G 18/4238* (2013.01); *C08G 18/6651* (2013.01); *C08G 18/7671* (2013.01); *D01F 1/07* (2013.01); *D01F 1/10* (2013.01); *D01F 6/94* (2013.01); *D03D 15/00* (2013.01); *D03D 15/08* (2013.01); *D10B 2401/041* (2013.01); *Y10T 442/30* (2015.04); *Y10T 442/40* (2015.04); *Y10T 442/60* (2015.04)

(58) Field of Classification Search
CPC ..... D01F 6/70; D01F 6/94; D01F 1/07; D01F 1/10; Y10T 442/60; Y10T 442/30; Y10T 442/40
See application file for complete search history.

(56) References Cited

U.S. PATENT DOCUMENTS

| | | |
|---|---|---|
| 3,993,619 A | 11/1976 | Kruckenberg et al. |
| 4,499,221 A | 2/1985 | Saitoh et al. |
| 5,371,166 A | 12/1994 | Farkus et al. |
| 2008/0295261 A1 | 12/2008 | Hartwig et al. |
| 2011/0046286 A1 | 2/2011 | Lubnin et al. |

FOREIGN PATENT DOCUMENTS

| | | |
|---|---|---|
| JP | S58225116 A | 12/1983 |
| KR | 0131833 B1 | 4/1998 |
| KR | 20120078434 A | 7/2012 |

*Primary Examiner* — Holly C Rickman
(74) *Attorney, Agent, or Firm* — Eryn Ace Fuhrer; Teresan W. Gilbert

(57) ABSTRACT

The invention relates to a thermoplastic polyurethane fibers, and process of making the same, where the described fiber has good dyeability, and in some embodiments, good flame retardant properties. Such fibers are made from a composition that includes (a) a thermoplastic polyurethane itself comprising the reaction product of: (i) one or more polyols, (ii) one or more diisocyanates, (iii) one or more chain extenders, (iv) optionally one or more crosslinking agents, and (v) one or more functional modifiers wherein each said functional modifier is a reaction product of an aminodiol and a Bronsted acid.

19 Claims, No Drawings

DYEABLE AND FLAME-RETARDED THERMOPLASTIC POLYURETHANE FIBERS

CROSS REFERENCE TO RELATED APPLICATION

This application claims priority from PCT Application Ser. No. PCT/US2013/063,966 filed on Oct. 9, 2013, which claims the benefit of U. S. Provisional Application No. 61/717,144 filed Oct. 23, 2012.

BACKGROUND OF THE INVENTION

The invention relates to a thermoplastic polyurethane fiber, and process of making the same, where the described fiber has good dyeability, and in some embodiments, good flame retardant properties.

While elastic fibers made of thermoplastic polyurethanes (TPU) have widened their uses and caught more attention recently in the emerging market of the textile industries, due to their many useful properties, their widespread use in applications that require dyeing have been limited. This is because TPU fibers are not easily dyeable as compared to conventional textile filaments, including those melt-spun from nylon or polyester or similar materials. Some TPU fibers may accept dye, but the dye fastness properties are typically not commercially acceptable. Other may be somewhat more dyeable by one type of dye but not by another, for example TPU fibers are generally not dyeable by common acidic and/or basic dyes.

These problems have persisted for years without any satisfactory solution and so it has become a common impression that TPU fibers can only be tinted (or stained) and not fully dyed by either acidic or basic dyes. Thus their use in applications that require dyeing have been limited.

One solution to these problems is to use solution dyes (or pigment dyes) with TPU fibers. However, solution dyes are limited by their available color shades and they are not as economical as more common dyes and dyeing processes.

Other solutions to the dyeability problems of TPU fibers include covering or blending the TPU fibers with other fibers that are more dyeable, in order to hide the lack of dyeability of the TPU fibers. However, in these situations, when such fabrics made from the covered and/or blended TPU fibers are stretched, the un-dyed or poorly dyed TPU fibers may show through the colored fiber covering or be otherwise visible in the fabric.

Thus, there is an ongoing need for TPU fibers that can be dyed, that is which have improved dyeability, especially with acidic and/or basic dyes. Such fibers would reduce, or even remove, the need for covering of thermoplastic polyurethane fibers and/or the blending of thermoplastic polyurethane fibers with other more dyeable fibers, providing a significant benefit to fabric manufactures and downstream industries that use dyed fabrics. Such fibers could be used in a wider array of applications where current TPU fibers are not suitable.

There is also an ongoing need for fibers, including thermoplastic polyurethane fibers, with improved flame retardant properties. A fiber with improved flame retardant properties could be used in applications where existing fibers, which have relatively poor flame retardant properties, cannot be used due to safety concerns and/or approval requirements for such applications.

The present invention addresses both of these ongoing needs.

SUMMARY OF THE INVENTION

The invention provides a fiber made from a thermoplastic polyurethane composition that includes (a) a thermoplastic polyurethane which itself comprises the reaction product of: (i) one or more polyols, (ii) one or more diisocyanates, (iii) one or more chain extenders, (iv) optionally one or more crosslinking agents, and (v) one or more functional modifiers. Each said functional modifier is itself a reaction product of an aminodiol and a Bronsted acid (which may also be referred to as a Bronsted acid).

The described thermoplastic polyurethane composition may further include (b) a second thermoplastic polyurethane which itself comprises the reaction product of: (i) one or more polyols, (ii) one or more diisocyanates, (iii) one or more chain extenders, and (iv) optionally one or more crosslinking agents, wherein the second thermoplastic polyurethane of component (b) is different from the thermoplastic polyurethane of component (a).

The described thermoplastic polyurethane composition may further include (c) a NCO-terminated pre-polymer.

The described thermoplastic polyurethane composition may further include (b) the second thermoplastic polyurethane and also include (c) the NCO-terminated pre-polymer.

Component (a) and components (b) and/or (c) may be mixed and/or reacted with one another and the resulting product can then be used to make the described fiber. Component (a) may be reacted with components (b) and/or (c) by reactive extrusion. However, component (a) may also be simply blended with component (b), that is, without a reaction.

In some embodiments, it is further specified that the functional modifier described herein is incorporated into the backbone of the thermoplastic polyurethane of component (a).

The fibers of the invention may be monofilament or multifilament fibers.

The invention further provides a fabric comprising any of the fibers described herein. The fabrics of the invention may be made up of solely the fibers described herein, but may also be made up of a combination of one or more other fibers. The fabrics of the invention may be non-woven fabrics or woven fabrics.

The invention further provides a process of making a fiber. The process includes the steps of: (I) preparing a thermoplastic polyurethane composition comprising (a) a thermoplastic polyurethane comprising the reaction product of: (i) one or more polyols, (ii) one or more diisocyanates, (iii) one or more chain extenders, (iv) optionally one or more crosslinking agents, and (v) one or more functional modifiers wherein each said functional modifier is a reaction product of an aminodiol and a Bronsted acid; (II) making a fiber from said thermoplastic polyurethane composition.

The thermoplastic polyurethane composition of the process may further include (b) a second thermoplastic polyurethane comprising the reaction product of: (i) one or more polyols, (ii) one or more diisocyanates, (iii) one or more chain extenders, and (iv) optionally one or more crosslinking agents, wherein the second thermoplastic polyurethane of component (b) is different from the thermoplastic polyurethane of component (a); (c) a NCO-terminated pre-polymer; or (d) both (b) and (c). In such embodiments, step (II) may further include mixing and/or reacting component (a) and component (b), (c), or (d), resulting in the thermoplastic polyurethane composition.

The invention further provides a method of increasing the dyeability of a fiber made from a thermoplastic polyurethane composition. The method includes the steps of: (I) adding one or more functional modifiers to a mixture of (i) one or more polyols, (ii) one or more diisocyanates, (iii) one or more chain extenders, and (iv) optionally one or more crosslinking agents wherein each said functional modifier is a reaction product of an aminodiol and a Bronsted acid; (II) reacting the mixture of step (I) resulting in a thermoplastic polyurethane wherein the functional modifier is incorporated into the backbone of the thermoplastic polyurethane; (III) preparing a thermoplastic polyurethane composition that comprises the thermoplastic polyurethane of step (II); and (IV) making a fiber from the resulting thermoplastic polyurethane composition wherein the resulting fiber has increased dyeability.

The thermoplastic polyurethane composition of the method may further include (b) a second thermoplastic polyurethane comprising the reaction product of: (i) one or more polyols, (ii) one or more diisocyanates, (iii) one or more chain extenders, and (iv) optionally one or more crosslinking agents, wherein the second thermoplastic polyurethane of component (b) is different from the thermoplastic polyurethane of component (a); (c) a NCO-terminated pre-polymer; or (d) both (b) and (c). In such embodiments, step (II) may further include mixing and/or reacting component (a) and component (b), (c), or (d), resulting in the thermoplastic polyurethane composition.

The invention further provides a method of increasing the flame retardancy of a fiber made from a thermoplastic polyurethane composition. The method includes the steps of: (I) adding one or more functional modifiers to a mixture of (i) one or more polyols, (ii) one or more diisocyanates, (iii) one or more chain extenders, and (iv) optionally one or more crosslinking agents wherein each said functional modifier is a reaction product of an aminodiol and a Bronsted acid; (II) reacting the mixture of step (I) resulting in a thermoplastic polyurethane wherein the functional modifier is incorporated into the backbone of the thermoplastic polyurethane; (III) preparing a thermoplastic polyurethane composition that comprises the thermoplastic polyurethane of step (II); and (IV) making a fiber from the resulting thermoplastic polyurethane composition wherein the resulting fiber has increased flame retardancy.

The thermoplastic polyurethane composition of the method may further include (b) a second thermoplastic polyurethane comprising the reaction product of: (i) one or more polyols, (ii) one or more diisocyanates, (iii) one or more chain extenders, and (iv) optionally one or more crosslinking agents, wherein the second thermoplastic polyurethane of component (b) is different from the thermoplastic polyurethane of component (a); (c) a NCO-terminated pre-polymer; or (d) both (b) and (c). In such embodiments, step (III) further comprises mixing and/or reacting component (a) and component (b), (c), or (d), resulting in the thermoplastic polyurethane composition.

DETAILED DESCRIPTION OF THE INVENTION

Various features and embodiments of the invention will be described below by way of non-limiting illustration.

The Fibers

The invention provides a fiber with improved dyeability, and in some embodiments improved flame retardant properties. The fibers of the invention are made from a composition that includes a thermoplastic polyurethane (TPU). This composition may be referred to as a thermoplastic polyurethane composition, or TPU composition.

The TPU present in the TPU composition can most generally be described as a TPU that contains a functional modifier in its backbone that is the primary chain structure of the TPU. The incorporation of this functional modifier into the backbone of the TPU is accomplished by adding the functional modifier to the reactants used to prepare the TPU. Adding the functional modifier after the reaction that produces the TPU could not result in the same type of structure, as the functional modifier would be present as merely a component of a TPU containing blend and so not reacted with the TPU, or possibly as a side chain or end group, which is bonded to the structure of the TPU but which is not incorporated into the backbone of the TPU. While not wishing to be bound by theory, it is believed that this distinction is important, and in order for the TPU fibers of the invention to provide the described benefits, including the improved dyeability, it is necessary for the functional modified to be incorporated into the TPU backbone, and more than just mixed with the TPU or grafted onto the TPU as a side chain or end group. Thus, the invention requires that the functional modifier be mixed with the reactants used to prepare the TPU itself, and for it to be present during the reaction that results in the TPU.

Thus, the fiber of the invention is described as being made from a TPU composition, where the TPU composition includes a TPU, where the TPU includes a reaction product of (i) one or more polyols, (ii) one or more diisocyanates, (iii) one or more chain extenders, (iv) optionally one or more crosslinking agents, and (v) one or more functional modifiers. The functional modifier includes a reaction product of an aminodiol and a Bronsted acid.

This results in a TPU where the functional modifier is incorporated into the backbone of the TPU. While not wishing to be bound by theory, it is believed having this functional modifier incorporated into the backbone of the TPU results in the polymer being more dyeable as the dye has areas with which it can more easily associate (the functional groups) as opposed to the TPU itself, which dyes generally do not associate with very well. It is also believed that this same mechanism can help improve the dispersability of fillers and other similar materials (not unlike dyes) throughout a TPU composition and improve the compatibility of such materials with TPU compositions, again by giving the fillers and similar materials areas on the TPU backbone with which they can more easily and/or more strongly associate.

The polyols useful for making the TPU compositions described herein are not overly limited. Suitable examples include hydroxyl terminated polyesters, hydroxyl terminated polyethers, hydroxyl terminated polycarbonates, or mixtures thereof, all of which are well known to those skilled in the art.

Suitable hydroxyl terminated polyester intermediates include linear polyester having a number average molecular weight (Mn) of from about 500 to about 10,000, from 700 to 5,000, or from 700 to 4,000, and/or an acid number generally less than 1.3 or less than 0.8. The molecular weight may be determined by assay of the terminal functional groups and is related to the number average molecular weight. The polyesters are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bi-functional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. In some embodiments, adipic acid is used to prepare the polyesters. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like, 1,4-butanediol is a preferred glycol.

Suitable hydroxyl terminated polyether intermediates include polyether polyols derived from a diol or polyol having a total of from 2 to 15 carbon atoms, in some embodiments an alkyl diol or glycol which is reacted with an ether (or an epoxide) which comprises an alkylene oxide group having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, polypropylene glycol) comprising propylene oxide reacted with propylene glycol, poly(tetramethylene glycol) comprising water reacted with tetrahydrofuran (PTMEG). In some embodiments, the polyether intermediate is PTMEG. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn) as determined by assay of the terminal functional groups which is an average molecular weight greater than about 700, such as from about 700 to about 10,000, from about 1000 to about 5000, or from about 1000 to about 2900 or even 2500.

Suitable hydroxyl terminated polycarbonates intermediates include polycarbonate polyols derived from the reaction of glycols and carbonates. U.S. Pat. No. 4,131,731, hereby incorporated by reference, discloses useful hydroxyl terminated polycarbonates and their preparation. Such polycarbonates are generally linear and have terminal hydroxyl groups with the essential exclusion of other terminal groups.

The essential reactants for preparing the hydroxyl terminated polycarbonates intermediates are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,5, neopentyl glycol, hexanediol-1,6, 2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3, 1,4-endo methylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable carbonates are selected from alkylene carbonates composed of a 5 to 7 member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkyl carbonates, cycloaliphatic carbonates, and diaryl carbonates. The dialkyl carbonates can contain 2 to 5 carbon atoms in each alkyl group and specific examples thereof are diethyl carbonate and dipropyl carbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diaryl carbonates, which can contain 6 to 20 carbon atoms in each aryl group, are diphenyl carbonate, ditolyl carbonate, and dinaphthyl carbonate.

In some embodiments, the TPU compositions of the present invention are prepared using polyethleneglycol (PEG). In other embodiments, the polyol of component (a) include a polyester made from the reaction of adipic acid with a diol or mixture of diols, for example 1,4-butanediol, 1,6-hexanediol, or a 50/50 blend of 1,4-butanediol and 1,6-hexanediol.

In some embodiments, the polyol of component (a) is chosen from the group consisting of hydroxyl terminated polyethers, hydroxyl terminated polyesters, hydroxyl terminated polycaprolactones, hydroxyl terminated polycarbonates, or mixture thereof. In some embodiments, the polyol of component (a) includes a hydroxyl terminated polyether, hydroxyl terminated polyester, or mixture thereof. In some embodiments, the polyol of component (a) includes a hydroxyl terminated polyether. In some embodiments, the polyol of component (a) includes a hydroxyl terminated polyester.

The diisocyanates useful for making the TPU compositions described herein are not overly limited. It is understood that polyisocyanates may also be used to prepare TPU, and in some embodiments, when the term diisocyanate is used herein, it is understood to include polyisocyanates. Suitable polyisocyanates have the formula $R(NCO)_n$ where n is generally from 2 to 4, and in some embodiments n is 2, thus providing a true diisocyanate. Polyisocyanates having a functionality of 3 or 4 may be utilized in very small amounts, for example, less than 5% and desirably less than 2% by weight based upon the total weight of all polyisocyanates, inasmuch as they cause crosslinking, where the bulk of the isocyanate component is made up of diisocyanates, thus diisocyanates as used herein is intended to allow for the presence of small amounts of polyisocyanates, as noted above. The R in the polyisocyanates structure can be aromatic, cycloaliphatic, and aliphatic, or combinations thereof generally having a total of from 2 to about 20 carbon atoms.

Examples of suitable aromatic diisocyanates include diphenyl methane-4, 4'-diisocyanate (MDI), $H_{12}$ MDI, m-xylylene diisocyanate (XDI), m-tetramethyl xylylene diisocyanate (TMXDI), phenylene-1, 4-diisocyanate (PPDI), 1,5-naphthalene diisocyanate (NDI), and diphenylmethane-3, 3'-dimethoxy-4, 4'-diisocyanate (TODI). Examples of suitable aliphatic diisocyanates include isophorone diisocyanate (IPDI), 1,4-cyclohexyl diisocyanate (CHDI), hexamethylene diisocyanate (HDI), 1,6-diisocyanato-2,2,4,4-tetramethyl hexane (TMDI), 1,10-decane diisocyanate, and trans-dicyclohexylmethane diisocyanate (HMDI). A highly preferred diisocyanate is MDI containing less than about 3% by weight of ortho-para (2,4) isomer.

In some embodiments, the isocyanate component includes an aromatic diisocyanate, an aliphatic diisocyanate, or a mixture thereof.

In some embodiments, the diisocyanate of component (a) comprises a non-hindered aromatic diisocyanate, an aliphatic diisocyanate, or a combination thereof. In some embodiments, the isocyanate component includes a non-hindered aromatic diisocyanate. In some embodiments, the isocyanate component includes an aliphatic diisocyanate.

Suitable chain extenders useful for making the TPU compositions described herein are not overly limited. They include lower aliphatic or short chain glycols having from about 2 to about 10 carbon atoms and include for instance ethylene glycol, diethylene glycol, propylene glycol, dipropylene glycol, tripropylene glycol, triethylene glycol, cis-trans-isomers of cyclohexyl dimethylol, neopentyl glycol, 1,4-butanediol, 1,6-hexandiol, 1,3-butanediol, and 1,5-pentanediol. The present invention requires a linear alkylene glycol chain extender, but in some embodiments additional chain extenders may be used in combination with the linear alkylene glycol chain extender. In such embodiments aromatic glycols can be used as the chain extender. Benzene glycol (HQEE) and xylylene glycols are suitable chain extenders for use in making the TPU of this invention. Xylylene glycol is a mixture of 1,4-di(hydroxymethyl) benzene and 1,2-di(hydroxymethyl) benzene. Benzene glycol is the preferred aromatic chain extender and specifically includes hydroquinone, bis(beta-hydroxyethyl) ether also known as 1,4-di(2-hydroxyethoxy) benzene; resorcinol, bis(beta-hydroxyethyl) ether also known as 1,3-di(2-hydroxyethyl) benzene; catechol, i.e., bis(beta-hydroxyethyl) ether also known as 1,2-di(2-hydroxyethoxy) benzene; and combinations thereof. In some embodiments the chain extender is 1,4-butanediol.

The optional crosslinking agents useful in the present invention are not overly limited. Useful crosslinking agents include a pre-polymer of a hydroxyl terminated intermediate which may be a polyether, polyester, polycarbonate, or polycaprolactone hydroxyl terminated intermediate, or any mixture thereof, reacted with a polyisocyanate. In some embodiments the crosslinking agent is prepared from a polyester or polyether hydroxyl terminated intermediate. The crosslinking agent, which may also be referred to as a pre-polymer and/or a branching agent, may have an isocyanate functionality of greater than about 1.0, often from about 1.0 to about 3.0, or even from about 1.8 to about 2.2. It some embodiments both ends of the hydroxyl terminated intermediate are capped with an isocyanate, thus having an isocyanate functionality of 2.0.

The polyisocyanates useful for making the crosslinking agent are the same as those described above for making the TPU. In some embodiments the polyisocyanate is a diisocyanate. In some embodiments the diisocyanate is MDI.

The hydroxyl terminated intermediates useful for making the crosslinking agent are the same as those described above for making the TPU. In some embodiments the hydroxyl terminated intermediate is a polyether, a polyester, or a mixture thereof.

In some embodiments the optional crosslinking agent of component (a) is present and comprises a compound derived from a polyether polyol and a diisocyanate.

The above components (the hydroxyl terminated intermediate, the polyisocyanate, the chain extender, and the options crosslinking agent) are reacted to form the TPU. The components may be reacted in the presence of a catalyst.

Generally, any conventional catalyst can be utilized to react the diisocyanate with the hydroxyl terminated intermediate or the chain extender and the same is well known to the art and to the literature. Examples of suitable catalysts include the various organo compounds, such as carbonates, of bismuth or tin wherein the alkyl portion has from 1 to about 20 carbon atoms with specific examples including bismuth octoate, bismuth laurate, and the like. Preferred catalysts include the various tin catalysts such as stannous octoate, dibutyltin dioctoate, dibutyltin dilaurate, and the like. The amount of such catalyst is generally small such as from about 20 to about 200 parts per million based upon the total weight of the polyurethane forming monomers.

The TPU polymers of this invention can be made by any of the conventional polymerization methods well known in the art and literature.

In some embodiments, the polyurethanes of the invention are made via a "one shot" process wherein all the components are added together simultaneously or substantially simultaneously to a heated extruder and reacted to form the polyurethane. The equivalent ratio of the diisocyanate to the total equivalents of the hydroxyl terminated intermediate and the diol chain extender is generally from about 0.95 to about 1.10, desirably from about 0.97 to about 1.03, and preferably from about 0.97 to about 1.00. In some embodiments, the Shore A hardness of the TPU formed will typically be from less than 80 A, 85 A or even 95 A. Reaction temperatures utilizing urethane catalyst may be from about 175° C. to about 245° C. or even from about 180° C. to about 220° C.

In some embodiments the TPU composition further comprises component (b), a second TPU. This second TPU, like the TPU of component (a), includes the reaction product of: (i) one or more polyols, (ii) one or more diisocyanates, (iii) one or more chain extenders, and (iv) optionally one or more crosslinking agents. However the TPU of component (b), the second TPU, when present, must of course be different from the TPU of component (a) in some way. One of the components used in the preparation of the second TPU may be different, or the ratios of the reactions used, etc.

In some embodiments the TPU composition further comprises component (c), a NCO-terminated pre-polymer. Suitable examples of these materials include the pre-polymer crosslinking agents described above. The distinction here is in regards to the point of addition relative to the reaction of the components. When the optional crosslinking agent is present in component (a) and/or component (b), it is reacting with the polyols, diisocyanates, and chain extenders as the TPU is formed. If the NCO-terminated pre-polymer is present as component (c), it is reacting with the TPU that is already formed from the reaction of the polyols, diisocyanates, and chain extenders.

In some embodiments the TPU composition further comprises component (b), the second TPU described above, and component (c), the NCO-terminated pre-polymer described above.

In any of the embodiments, the components may be mixed by any conventional means, including extrusion, and in embodiments where component (c) is present, reactive extrusion.

The functional modifiers of the invention include the reaction product of an aminodiol and a Bronsted acid.

The functional modifier useful in the present invention is a salt which is the reaction product of an aminodiol and a Bronsted acid, such as a phosphonic acid, phosphinic acid, sulfonic acid, or an acid phosphate.

Examples of aminodiols useful in forming the functional modifier include: N-methyldiethanolamine (MDEA), 3-diethylamino-1,2-propanediol (DEAPD), 2-amino-2-methyl-1,3-propanediol (AMPD), N-(n-butyl)diethanolamine (BDEA), N-(t-butyl)diethanol-amine (TBDEA), N-phenyldiethanolamine (PDEA), diethyl N-N-bis(2-hydroxyethyl) amino-methyl phosphonate sold under the tradename FYROL 6 as well as any combinations thereof. Additional aminodiols include: N-ethyldiethanolamine; N-propyldiethanolamine; N-isopropyldiethanolamine; aminopropyldiethanolamine; 3-amino-1,2-propanediol; 3-dimethylamino-1,2-propanediol; 3-dipropylamino-1,2-propanediol; 3-diisopropylamino-1,2-propanediol; 2-amino-1,3-propanediol; 2-amino-2-ethyl-1,3-propanediol; N,N'-bis(2-hydroxyethyl)ethylenediamine; 3-pyrrolidino-1,2-propanediol; diethanolamine; diisopropanolamine; 3-piperidino-1,2-propanediol; 4,4'-trimethylene bis(1-piperidine ethanol); 1,4-bis(2-hydroxyethyl)piperazine; 3-morpholino-1,2-propanediol; bis(2-hydroxyethyl)octadecylamine; other ethoxylated fatty amines and propoxylated fatty amines as well as any combinations thereof. In some embodiments the aminodiol is MDEA.

Useful Bronsted acids include: phosphonic acids, phosphinic acids, sulfonic acids and acid phosphates. Examples of phosphonic acids include but are not limited to: methylphosphonic acid; ethylphosphonic acid; propylphosphonic acid; butylphosphonic acid; t-butylphosphonic acid; methylenediphosphonic acid; 2-chloroethylphosphonic acid; phenyl phosphonic acid; phosphonoacetic acid; and phosphonopropionic acid as well as any combination thereof. Illustrative examples of phosphinic acids include: phenylphosphinic acid; diphenylphosphinic acid; dimethylphosphinic acid; and bis(4-methoxyphenyl) phosphinic acid. Possible sulfonic acids to be used include: methanesulfonic acid; ethanesulfonic acid; propanesulfonic acid; sulfoacetic acid; sulfosuccinic acid; benzenesulfonic acid; 4-ethylbenzenesulfonic acid; 4-hydroxybenzenesulfonic acid; 4-chlorobenzenesulfonic acid; p-toluenesulfonic acid; 4-sulfophthalic acid; 1-naphthalenesulfonic acid; 2-naphthalenesulfonic acid; 3-sulfobenzoic acid; 4-sulfobenzoic acid; and 5-sulfoisophthalic acid. The acid phosphates are mixtures of acid esters, preferably equimolar mixtures of diesters and monoesters. Examples of acid phosphates include both aromatic and aliphatic acid phosphates. Examples include amyl acid phosphate (AAP), 2-ethylhexyl acid phosphate (EHAP), methyl acid phosphate (MAP), ethyl acid phosphate (EAP), polyoxyethylene nonylphenyl ether phosphate (e.g. Rhodafac® RE 610), branched alcohol ethoxylated based phosphate esters (e.g. Rhodafac® RS 610), as well as any combinations thereof. Additional examples of organic acid phosphates include: 2-chloroethyl acid phosphate; n-butyl acid phosphate; butoxyethyl acid phosphate; ethylene glycol acid phosphate; 2-hydroxyethyl methacrylate acid phosphate; isooctyl acid phosphate; octyl acid phosphate; stearyl acid phosphate; n-propyl acid phosphate; n-hexyl acid phosphate; tridecyl acid phosphate; lauryl acid phosphate; cetyl acid phosphate; oleyl acid phosphate; phenyl acid phosphate; octylphenyl acid phosphate; and fluorinated phosphoric acid ester blends such as Zonyl® UR as well as any combinations thereof. Acid phosphates are the most preferred type of Bronsted acid. In some embodiments the acid phosphate includes Rhodafac® RE 610.

The functional modifier is prepared by reacting an aminodiol with a Bronsted acid compound. The synthesis can be carried out neat or in solution. In a neat reaction, the reactants can be charged together into the reaction vessel. An exotherm is observed. In a solution reaction, dropwise addition of reactants is preferred. The functional modifiers obtained in these syntheses vary from crystalline solids to viscous, pourable liquids at room temperature. Alternatively, the functional modifier can be prepared by adding the aminodiol and Bronsted acid compound to the chain extender and/or polyol. The stoichiometry used in the functional modifier synthesis depends on the nature of the Bronsted acid compound. For monobasic acids, an equimolar mount of aminodiol is generally used. For dibasic acids, the amount of aminodiol used may correspond to the first equivalence point or the second equivalence point of the acid. If desired, a slight excess of aminodiol may be used in some systems.

In some embodiments the Bronsted acid includes at least one carboxylic acid, phosphonic acid, phosphinic acid, sulfonic acid, an acid phosphate, or combinations thereof. In some embodiments the Bronsted acid includes acid phosphate, and the amine salts resulting therefrom. Useful Bronsted acids include polyoxyalkylene alkyl ether phosphates. In some embodiments the aminodiol includes N-methyldiethanolamine (MDEA).

The TPU and/or the TPU compositions used to make the fibers of the invention may also include one or more additives. Such optional additives are not overly limited. Useful additives can be utilized in suitable amounts and include opacifying pigments, colorants, mineral fillers, stabilizers, lubricants, UV absorbers, processing aids, hydrolytic stabilizers, and other additives as desired. Useful opacifying pigments include titanium dioxide, zinc oxide, and titanate yellow, while useful tinting pigments include carbon black, yellow oxides, brown oxides, raw and burnt sienna or umber, chromium oxide green, cadmium pigments, chromium pigments, and other mixed metal oxide and organic pigments. Useful fillers include diatomaceous earth (superfloss) clay, silica, talc, mica, wallostonite, barium sulfate, and calcium carbonate. If desired, useful stabilizers such as antioxidants can be used and include phenolic antioxidants, while useful photostabilizers include organic phosphates, and organotin thiolates (mercaptides). Useful lubricants include metal stearates, paraffin oils and amide waxes. Useful UV absorbers include 2-(2'-hydroxyphenol) benzotriazoles and 2-hydroxybenzophenones. Examples of hydrolytic stabilizers include carbodiimides Plasticizer additives can also be utilized advantageously to reduce hardness without affecting properties.

The TPU and/or the TPU compositions used to make the fibers of the invention may also include one or more additional TPU and/or other polymers as a blend component, such that the resulting fiber is made from a blend of the described TPU with one or more polymers, including one or more TPU other than the TPU described above.

In some embodiments no such blend component is present an the fibers of the invention are made from the described TPU composition, which is substantially free, or even completely free of, any other polymer component and/or additional TPU component.

In some embodiments the TPU of component (a), after the TPU forming reaction is complete but before the TPU is made into a fiber, has a weight average molecular weight from about 20,000 to about 1,500,000, or from 40,000 to 600,000, from 50,000 to 500,000, from, 100,000 to 400,000, or from 200,000 to 350,000. The TPU of component (b), when present, before the TPU is made into a fiber, may have a weight average molecular weight from about 20,000 to about 1,500,000, or from 40,000 to 600,000, from 50,000 to 500,000, from, 100,000 to 400,000, or from 200,000 to 350,000.

The fibers of the invention may be prepared by a process including the steps of: (I) preparing any of the TPU compositions described above; and (II) making a fiber from said TPU composition.

In some embodiments the fiber of the invention are monofilament fibers. These monofilament fibers may have a diameter of about anywhere from 10 to 10,000 or even 2,000 denier. The monofilament fibers may have diameters from 10, 20, 30, or even 40 denier, up to diameters of 10,000, 2,000, 950, or even 360 denier.

In some embodiments the fiber of the invention are multifilament fibers. The individual fibers of the multifilament may each have diameters of anywhere from 30 to 350 or 40 to 300 denier. More importantly the overall multifilament fiber itself may have a diameter anywhere from 40 to 300, or from 30, 40,50, 80, 150 or even 180 up to 350, 300, 180, or even 150. The filament count for these multifilament fibers may be anywhere from 2 to 200, or from 2, 5, 10, 15 or even 17 up to 200, 120, 100, 80 or even 50 filaments.

In any of these embodiments the weight average molecular weight of the fiber may be at least 400,000. In some embodiments, for example embodiments where no crosslinking agent is used in making the TPU, the weight average molecular weight of the fibers is at least 20,000, 40,000, 50,000, 100,000, or even 200,000. In some embodiments, for example embodiments where no crosslinking agent is used in making the TPU, the weight average molecular weight of the fibers is at least 300,000, 350,000, or even 400,000. In some embodiments, for example embodiments where no crosslinking agent is used in making the TPU, the weight average molecular weight of the fibers is from 20,000 to 1,500,000, or from 40,000 to 600,000, or from 50,000 to 500,000, or from 100,000 or even 200,000 up to 400,000. In some embodiments, for example embodiments where a crosslinking agent is used in making the TPU, the weight average molecular weight of the fibers is from 50,000 to 1,500,000, or from 100,000 to 600,000, or from 200,000 or even 400,000 up to 500,000.

The Fabrics

The fibers of the invention may be used in the form of a fabric such as a knit, a woven, and a bonded textile. The fabric of the invention may solely comprise the fiber of the invention and in other embodiments may comprise the fiber of the invention and another fiber twisted together for improving the factors required for specific applications. Such optional co-fibers are not particularly limited and examples include polyamide type resins such as nylon 6 and nylon 12, polyesters, cotton, and rayon.

The invention includes fabrics made from any of the fibers described herein, including woven fabric, non-woven fabric, knitted fabric, and combinations thereof. In some embodiments, the fabrics of the invention are woven fabrics. In other embodiments, the fabrics of the invention are non-woven fabrics. In still other embodiments, the fabrics of the invention are knitted fabrics. In addition, the invention includes fabrics that further contain one or more additional fibers, other than the fibers of the invention. The fabric may be from 10 to 80 percent by weight of these additional fibers, or no more than 90%, 80%, 70%, 60%, 50%, 40%, 30%, 20%, or 10% of these additional fibers. In some embodiments, no additional fibers are present. In embodiments where there are one or more additional fibers present in the fabric, these additional fibers may be nylon fibers, polyester fibers, rayon fibers, acrylic fibers, and combinations thereof.

The invention also includes a method of making a fabric that includes the steps of: (I) preparing one of the TPU compositions described above; (II) melt-spinning said TPU composition into a fiber; and (III) processing the fiber, optionally in combination with one or more other fibers, into a fabric.

In some embodiments the fabric of the invention includes at least one of the fibers described above. In some embodiments the fabric is made from fibers that are 100% fibers of the invention (no conventional co-fiber is used).

In some embodiments the fabric is a woven fabric. In some embodiments the fabric is a non-woven fabric. These include staple and/or staplebond non-woven fabrics, spunlaid and/or spunbond and/or melt blown non-woven fabrics, or combinations thereof.

Industrial Application

The invention also provides a method of increasing the dyeability of a fiber made from a TPU composition, and so also any resulting fabrics and articles thereof. This method includes the steps of: (I) adding one or more functional modifiers to a mixture of (i) one or more polyols, (ii) one or more diisocyanates, (iii) one or more chain extenders, and (iv) optionally one or more crosslinking agents wherein each functional modifier is itself a reaction product of an aminodiol and a Bronsted acid; (II) reacting the mixture of step (I) resulting in a TPU wherein the functional modifier is incorporated into the backbone of the TPU; (III) preparing a TPU composition that comprises the TPU of step (II); (IV) making a fiber from the resulting TPU composition; wherein the resulting fiber has increased dyeability compared to a corresponding fiber made without the functional modifiers.

It is noted that the TPU composition may simply be the TPU itself, however in some embodiments, additional additives and/or components, as described above, may be added to result in the TPU composition. For example, the TPU composition may further include: (b) a second thermoplastic polyurethane comprising the reaction product of: (i) one or more polyols, (ii) one or more diisocyanates, (iii) one or more chain extenders, and (iv) optionally one or more crosslinking agents, wherein the second thermoplastic polyurethane of component (b) is different from the thermoplastic polyurethane of component (a). In some embodiments the TPU composition may further include (c) a NCO-terminated pre-polymer. In still further embodiments the TPU composition may further include both (b) and (c). In such embodiments step (III) may further include mixing and/or reacting component (a) and component (b) and/or (d), resulting in the TPU composition. Essentially any of the TPU and TPU compositions described above may be used in this method.

The invention also provides a method of increasing the flame retardancy of a fiber made from a TPU composition, and so also any resulting fabrics and articles thereof. This method includes the steps of: (I) adding one or more functional modifiers to a mixture of (i) one or more polyols, (ii) one or more diisocyanates, (iii) one or more chain extenders, and (iv) optionally one or more crosslinking agents wherein each functional modifier is itself a reaction product of an aminodiol and a Bronsted acid; (II) reacting the mixture of step (I) resulting in a TPU wherein the functional modifier is incorporated into the backbone of the TPU; (III) preparing a TPU composition that comprises the TPU of step (II); (IV) making a fiber from the resulting TPU composition; wherein the resulting fiber has increased the flame retardancy compared to a corresponding fiber made without the functional modifiers.

The invention still further provides methods of increasing both the flame retardancy and the dyeability of a fiber made from a TPU composition. It is also noted that the invention provides methods of increasing the flame retardancy, the dyeability, or both the flame retardancy and the dyeability of a TPU composition itself.

It is noted that the TPU composition may simply be the TPU itself, however in some embodiments, additional additives and/or components, as described above, may be added to result in the TPU composition. For example, the TPU composition may further include: (b) a second thermoplastic polyurethane comprising the reaction product of: (i) one or more polyols, (ii) one or more diisocyanates, (iii) one or more chain extenders, and (iv) optionally one or more crosslinking agents, wherein the second thermoplastic polyurethane of component (b) is different from the thermoplastic polyurethane of component (a). In some embodiments the TPU composition may further include (c) a NCO-terminated pre-polymer. In still further embodiments the TPU composition may further include both (b) and (c). In such embodiments step (III) may further include mixing and/or reacting component (a) and component (b) and/or (d), resulting in the TPU composition. Essentially any of the TPU and TPU compositions described above may be used in this method.

The Articles

The fiber of the invention and the fabrics made therefrom may be used for producing articles including clothing. The articles and/or clothing of the invention may contain natural fibers such as cotton and flax, and semi-synthesized fibers such as rayon and acetate based on the necessity besides the fiber of the invention.

A method of producing the articles and/or clothing of the invention is not particularly limited and for example, conventionally known methods such as a method of producing clothing by weaving the fiber of the invention can be employed. These materials may also be produced by the conventionally known methods of sewing, cutting and the like, using the fabrics of the invention.

The invention includes an article made from the fabrics described above. For example, various garments can be made with the fabrics of this invention. It will be understood by those skilled in the art that any garment can be made from the fabric and fibers of this invention.

EXAMPLES

The invention will be further illustrated by the following examples, which sets forth particularly advantageous embodiments. While the examples are provided to illustrate the present invention, they are not intended to limit it.

Functional Modifier 1

A functional modifier is prepared so that it may be used in the preparation of a thermoplastic polyurethane (TPU). N-methyldiethanolamine (20.5 g) is added slowly with stirring to nonylphenol ethoxylate based phosphate esters, commercially available as Rhodafac® RE-610 (79.5 g). During the addition, the temperature increases to about 50° C. When the addition is complete, stirring is continued for about 2 hours during which time the temperature gradually cools to ambient, giving a homogeneous liquid.

Functional Modifier 2

A second functional modifier is prepared. N-methyldiethanolamine (48.9 g) is added slowly with stirring to Rhodafac® RE-610 (51.1 g). During the addition, the temperature increases to about 50° C. When the addition is complete, stirring is continued for about 2 hours during which the temperature gradually cools to ambient, giving a homogeneous liquid.

Comparative Example 1

A comparative TPU is prepared by combining 282.7 g of poly(tetramethylene/hexamethylene) adipate (which has a molecular weight of 2630 g/mol determined via end-group analysis) and 17.3 g of 1,4-butanediol and heating the mixture to 120° C. with stirring. Then 75.8 g of diphenylmethanediisocyanate (MDI) is heated to 120° C. and then is added rapidly to the blend. After two minutes of vigorous stirring the molten polymer is discharged to a cooled Teflon-coated pan and cured, first for two hours at 105° C. and then for 24 hours at 70° C., resulting in a TPU composition.

Inventive Example 2

An inventive TPU is prepared by combining 273.8 g of the same poly(tetramethylene/hexamethylene) adipate used in Comparative Example 1, 16.8 g of 1,4-butanediol, and 9.4 g of Functional Modifier 1 and heating the mixture to 120° C. with stirring. Then 77.5 g of MDI is heated to 120° C. and then is added rapidly to the blend. After two minutes of vigorous stirring, the molten polymer is discharged into a cooled Teflon-coated pan and cured, first for two hours at 105° C. and then for 24 hours at 70° C., resulting in a TPU composition.

Example 3

An inventive TPU is prepared by combining 273.6 g of the same poly(tetramethylene/hexamethylene) adipate used in Comparative Example 1, 16.8 g of 1,4-butanediol, and 9.6 g of Functional Modifier 2 and heating the mixture to 120° C. with stirring. Then 83.2 g of MDI is heated to 120° C. and then is added rapidly to the blend. After two minutes of vigorous stirring, the molten polymer is discharged into a cooled Teflon-coated pan and cured, first for two hours at 105° C. and then for 24 hours at 70° C., resulting in a TPU composition.

Each of the TPU composition examples is melt spun into a fiber under typical processing conditions. Fiber of the TPU composition examples are made to various deniers, including 20 denier, 70 denier, 140 denier, and 360 denier.

The three TPU composition examples are then tested to determine dyeability. To evaluate the dyeability the Applicants measured (i) percent total dye exhaustion, (ii) dye exhaustion rate over the first ten minutes as a percent per minute, and (iii) dye exhaustion rate for the full dyeing cycle as a percent per minute. This testing was conducted through a 3$^{rd}$ party outside lab, using industry recognized test procedures. Using these measurements Example 1 provides results of: (i) 5.88%, (ii) 0.27%, and (iii) 0.03%, indicating the poorest dyeability of the series. Example 2 provides results of: (i) 9.44%, (ii) 0.71%, and (iii) 0.04%, indicating improved dyeability. Example 3 provides results of: (i) 15.69%, (ii) 0.97%, and (iii) 0.11%, indicating further improved dyeability.

The results show that the TPU composition of the invention, and more specifically, fibers made therefrom, have improved dyeability. Further this improved dyeability may be controlled by adjusting the content of the amine and/or phosphate used to prepare the functional modifier, as well as the amount used in the TPU.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, all percent values, ppm values and parts values are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. Unless otherwise indicated, all molecular weight values are weight average values. As used herein, the expression "consisting essentially of" permits the inclusion of substances that do not materially affect the basic and novel charac-teristics of the composition under consideration.

We claim:

1. A fabric comprising:
   a fiber made from a thermoplastic polyurethane composition, wherein said thermoplastic polyurethane composition comprises:
   (a) a thermoplastic polyurethane comprising the reaction product of: (i) one or more polyols, (ii) one or more diisocyanates, (iii) one or more chain extenders, (iv) optionally one or more crosslinking agents, and (v) one or more functional modifiers;
   wherein each said functional modifier is a reaction product of an aminodiol and a Bronsted acid wherein the aminodiol comprises N-methyldiethanolamine (MDEA), 3-diethylamino-1,2-propanediol (DEAPD), 2-amino-2-methyl-1,3-propanediol (AMPD), N-(n-butyl)diethanolamine (BDEA), N-(t-butyl)diethanolamine (TBDEA), N-phenyldiethanolamine (PDEA), diethyl N-N-bis(2-hydroxyethyl) amino-methyl phosphonate, N-ethyldiethanolamine, N-propyldiethanolamine, N-isopropyldiethanolamine, aminopropyldiethanolamine, 3-amino-1,2-propanediol, 3-dimethylamino-1,2-propanediol, 3-dipropylamino-1,2-propanediol, 3-diisopropylamino-1,2-propanediol, 2-amino-1,3-propanediol, 2-amino-2-ethyl-1,3-propanediol, N,N'-bis(2-hydroxyethyl)ethylenediamine, 3-pyrrolidino-1,2-propanediol, diethanolamine, diisopropanolamine, 3-piperidino-1,2-propanediol, 4,4'-trimethylene bis(1-piperidine ethanol), 1,4-bis(2-hydroxyethl)piperazine, 3-morpholino-1,2-propanediol, bis(2-hydroxyethyl)octadecylamine, or any combinations thereof;
   wherein the functional modifier is incorporated into the backbone of the thermoplastic polyurethane of component (a).

2. The fabric of claim 1 wherein said thermoplastic polyurethane composition further comprises:
   (b) a second thermoplastic polyurethane comprising the reaction product of: (i) one or more polyols, (ii) one or more diisocyanates, (iii) one or more chain extenders, and (iv) optionally one or more crosslinking agents, wherein the second thermoplastic polyurethane is different from the thermoplastic polyurethane of component (a);
   (c) a NCO-terminated pre-polymer; or
   (d) both (b) and (c)
   wherein component (a) and component (b), (c), or (d) are mixed and/or reacted with one another and the resulting product is used to make the fiber.

3. The fabric of claim 1 wherein said Bronsted acid comprises at least one carboxylic acid, phosphonic acid, phosphinic acid, sulfonic acid, an acid phosphate, or combinations thereof.

4. The fabric of claim 1 wherein said diisocyanate of component (a) comprises a non-hindered aromatic diisocyanate, a aliphatic diisocyanate, or a combination thereof;
   wherein said polyol of component (a) is chosen from the group consisting of hydroxyl terminated polyethers, hydroxyl terminated polyesters, hydroxyl terminated polycaprolactones, hydroxyl terminated polycarbonates, or mixture thereof.

5. The fabric of claim 1 where the fiber is a monofilament fiber having a diameter of about 20 to 360 denier.

6. The fabric of claim 1 where the fiber is a multifilament fiber having an overall diameter of about 30 to 300 denier and a filament count of from 10 to 100.

7. The fabric of claim 1 wherein component (a), before it is made into a fiber, has a weight average molecular weight from about 20,000 to about 1,500,000.

8. The fabric of claim 1 wherein the weight average molecular weight of the fiber is at least 400,000.

9. The fabric of claim 1 wherein the optional crosslinking agent of component (a) is present and comprises a compound derived from a polyether polyol and a diisocyanate.

10. The fabric of claim 1 wherein the fabric is a non-woven fabric.

11. The fabric of claim 1 wherein the fabric is a woven fabric or a knit fabric.

12. A process of making a fiber, comprising the steps of:
    (I) preparing a thermoplastic polyurethane composition comprising (a) a thermoplastic polyurethane comprising the reaction product of: (i) one or more polyols, (ii) one or more diisocyanates, (iii) one or more chain extenders, (iv) optionally one or more crosslinking agents, and (v) one or more functional modifiers wherein each said functional modifier is a reaction product of an aminodiol and a Bronsted acid, wherein the aminodiol comprises N-methyldiethanolamine (MDEA), 3-diethylamino-1,2-propanediol (DEAPD), 2-amino-2-methyl-1,3-propanediol (AMPD), N-(n-butyl)diethanolamine (BDEA), N-(t-butyl)diethanolamine (TBDEA), N-phenyldiethanolamine (PDEA), diethyl N-N-bis(2-hydroxyethyl) amino-methyl phosphonate, N-ethyldiethanolamine, N-propyldiethanolamine, N-isopropyldiethanolamine, aminopropyldiethanolamine, 3-amino-1,2-propanediol, 3-dimethylamino-1,2-propanediol, 3-dipropylamino-1,2-propanediol, 3-diisopropylamino-1,2-propanediol, 2-amino-1,3-propanediol, 2-amino-2-ethyl-1,3-propanediol, N,N'-bis(2-hydroxyethyl)ethylenediamine, 3-pyrrolidino-1,2-propanediol, diethanolamine, diisopropanolamine, 3-piperidino-1,2-propanediol, 4,4'-trimethylene bis(1-piperidine ethanol), 1,4-bis(2-hydroxyethl)piperazine, 3-morpholino-1,2-propanediol, bis(2-hydroxyethyl)octadecylamine, or any combinations thereof;

(II) making a fiber from said thermoplastic polyurethane composition;

wherein the functional modifier is incorporated into the backbone of the thermoplastic polyurethane of component (a).

13. The process of claim 12 wherein the thermoplastic polyurethane composition further comprises:

(b) a second thermoplastic polyurethane comprising the reaction product of: (i) one or more polyols, (ii) one or more diisocyanates, (iii) one or more chain extenders, and (iv) optionally one or more crosslinking agents, wherein the second thermoplastic polyurethane of component (b) is different from the thermoplastic polyurethane of component (a);

(c) an NCO-terminated pre-polymer; or (d) both (b) and (c); and wherein step (II) further comprises mixing and/or reacting component (a) and component (b), (c), or (d), resulting in the thermoplastic polyurethane composition.

14. A method of increasing the dyeability of a fiber made from a thermoplastic polyurethane composition, said method comprising the steps of:

(I) adding one or more functional modifiers to a mixture of (i) one or more polyols, (ii) one or more diisocyanates, (iii) one or more chain extenders, and (iv) optionally one or more crosslinking agents;

wherein each said functional modifier is a reaction product of an aminodiol and a Bronsted acid, wherein the aminodiol comprises N-methyldiethanolamine (MDEA), 3-diethylamino-1,2-propanediol (DEAPD), 2-amino-2-methyl-1,3-propanediol (AMPD), N-(n-butyl)diethanolamine (BDEA), N-(t-butyl)diethanolamine (TBDEA), N-phenyidiethanolamine (PDEA), diethyl N-N-bis(2-hydroxyethyl) amino-methyl phosphonate, N-ethyldiethanolamine, N-propyldiethanolamine, N-isopropyldiethanolamine, aminopropyldiethanolamine, 3-amino-1,2-propanediol, 3-dimethylamino-1,2-propanediol, 3-dipropylamino-1,2-propanediol, 3-diisopropylamino-1,2-propanediol, 2-amino-1,3-propanediol, 2-amino-2-ethyl-1,3-propanediol, N,N'-bis(2-hydroxyethyl)ethylenediamine, 3-pyrrolidino-1,2-propanediol, diethanolamine, diisopropanolamine, 3-piperidino-1,2-propanediol, 4,4'-trimethylene bis(1-piperidine ethanol), 1,4-bis(2-hydroxyethl)piperazine, 3-morpholino-1,2-propanediol, bis(2-hydroxyethyl)octadecylamine, or any combinations thereof; and (II) reacting the mixture of step (I) resulting in a thermoplastic polyurethane wherein the functional modifier is incorporated into the backbone of the thermoplastic polyurethane;

(III) preparing a thermoplastic polyurethane composition that comprises the thermoplastic polyurethane of step (II);

(IV) making a fiber from the resulting thermoplastic polyurethane composition; wherein the resulting fiber has increased dyeability;

wherein the functional modifier is incorporated into the backbone of the thermoplastic polyurethane of component (a).

15. The method of claim 14 wherein the thermoplastic polyurethane composition of step (III) further comprises:

(b) a second thermoplastic polyurethane comprising the reaction product of: (i) one or more polyols, (ii) one or more diisocyanates, (iii) one or more chain extenders, and (iv) optionally one or more crosslinking agents, wherein the second thermoplastic polyurethane of component (b) is different from the thermoplastic polyurethane of component (a);

(c) an NCO-terminated pre-polymer; or (d) both (b) and (c); and wherein step (III) further comprises mixing and/or reacting component (a) and component (b), (c), or (d), resulting in the thermoplastic polyurethane composition.

16. A method of increasing the flame retardancy of a fiber made from a thermoplastic polyurethane composition, said method comprising the steps of:

(I) adding one or more functional modifiers to a mixture of (i) one or more polyols, (ii) one or more diisocyanates, (iii) one or more chain extenders, and (iv) optionally one or more crosslinking agents;

wherein each said functional modifier is a reaction product of an aminodiol and a Bronsted acid, wherein the aminodiol comprises N-methyldiethanolamine (MDEA), 3-diethylamino-1,2-propanediol (DEAPD), 2-amino-2-methyl-1,3-propanediol (AMPD), N-(n-butyl)diethanolamine (BDEA), N-(t-butyl)diethanolamine (TBDEA), N-phenyidiethanolamine (PDEA), diethyl N-N-bis(2-hydroxyethyl) amino-methyl phosphonate, N-ethyldiethanolamine, N-propyldiethanolamine, N-isopropyldiethanolamine, aminopropyldiethanolamine, 3-amino-1,2-propanediol, 3-dimethylamino-1,2-propanediol, 3-dipropylamino-1,2-propanediol, 3-diisopropylamino-1,2-propanediol, 2-amino-1,3-propanediol, 2-amino-2-ethyl-1,3-propanediol, N,N'-bis(2-hydroxyethyl)ethylenediamine, 3-pyrrolidino-1,2-propanediol, diethanolamine, diisopropanolamine, 3-piperidino-1,2-propanediol, 4,4'-trimethylene bis(1-piperidine ethanol), 1,4-bis(2-hydroxyethl)piperazine, 3-morpholino-1,2-propanediol, bis(2-hydroxyethyl)octadecylamine, or any combinations thereof; and (II) reacting the mixture of step (I) resulting in a thermoplastic polyurethane wherein the functional modifier is incorporated into the backbone of the thermoplastic polyurethane;

(III) preparing a thermoplastic polyurethane composition that comprises the thermoplastic polyurethane of step (II);

(IV) making a fiber from the resulting thermoplastic polyurethane composition;

wherein the resulting fiber has increased flame retardancy;

wherein the functional modifier is incorporated into the backbone of the thermoplastic polyurethane of component (a).

17. The method of claim 16 wherein the thermoplastic polyurethane composition of step (III) further comprises:

(b) a second thermoplastic polyurethane comprising the reaction product of: (i) one or more polyols, (ii) one or more diisocyanates, (iii) one or more chain extenders, and (iv) optionally one or more crosslinking agents, wherein the second thermoplastic polyurethane of component (b) is different from the thermoplastic polyurethane of component (a);
(c) an NCO-terminated pre-polymer; or
(d) both (b) and (c); and
wherein step (III) further comprises mixing and/or reacting component (a) and component (b), (c), or (d), resulting in the thermoplastic polyurethane composition.

18. A method of increasing the flame retardancy and/or dyeability of thermoplastic polyurethane composition, said method comprising the steps of:
(I) adding one or more functional modifiers to a mixture of (i) one or more polyols, (ii) one or more diisocyanates, (iii) one or more chain extenders, and (iv) optionally one or more crosslinking agents;
wherein each said functional modifier is a reaction product of an aminodiol and a Bronsted acid, wherein the aminodiol comprises N-methyldiethanolamine (MDEA), 3-diethylamino-1,2-propanediol (DEAPD), 2-amino-2-methyl-1,3-propanediol (AMPD), N-(n-butyl)diethanolamine (BDEA), N-(t-butyl)diethanolamine (TBDEA), N-phenyidiethanolamine (PDEA), diethyl N-N-bis(2-hydroxyethyl) amino-methyl phosphonate, N-ethyldiethanolamine, N-propyldiethanolamine, N-isopropyldiethanolamine, aminopropyldiethanolamine, 3-amino-1,2-propanediol, 3-dimethylamino-1,2-propanediol, 3-dipropylamino-1,2-propanediol, 3-diisopropylamino-1,2-propanediol, 2-amino-1,3-propanediol, 2-amino-2-ethyl-1,3-propanediol, N,N'-bis(2-hydroxyethyl)ethylenediamine, 3-pyrrolidino-1,2-propanediol, diethanolamine, diisopropanolamine, 3-piperidino-1,2-propanediol, 4,4'-trimethylene bis(1-piperidine ethanol), 1,4-bis(2-hydroxyethl)piperazine, 3-morpholino-1,2-propanediol, bis(2-hydroxyethyl)octadecylamine, or any combinations thereof; and
(II) reacting the mixture of step (I) resulting in a thermoplastic polyurethane wherein the functional modifier is incorporated into the backbone of the thermoplastic polyurethane;
(III) preparing a thermoplastic polyurethane composition that comprises the thermoplastic polyurethane of step (II);
(IV) making a fiber from the resulting thermoplastic polyurethane composition;
wherein the resulting fiber has increased flame retardancy and/or dyeability;
wherein the functional modifier is incorporated into the backbone of the thermoplastic polyurethane of component (a).

19. The method of claim 18 wherein the thermoplastic polyurethane composition of step (III) further comprises:
(b) a second thermoplastic polyurethane comprising the reaction product of: (i) one or more polyols, (ii) one or more diisocyanates, (iii) one or more chain extenders, and (iv) optionally one or more crosslinking agents, wherein the second thermoplastic polyurethane of component (b) is different from the thermoplastic polyurethane of component (a);
(c) an NCO-terminated pre-polymer; or
(d) both (b) and (c); and
wherein step (III) further comprises mixing and/or reacting component (a) and component (b), (c), or (d), resulting in the thermoplastic polyurethane composition.

* * * * *